US012251954B1

(12) United States Patent
Gilpin

(10) Patent No.: US 12,251,954 B1
(45) Date of Patent: Mar. 18, 2025

(54) HOLOGRAM GREETING CARD

(71) Applicant: HOLOPOP LLC, Virginia Beach, VA (US)

(72) Inventor: Ash Gilpin, Virginia Beach, VA (US)

(73) Assignee: HOLOPOP LLC, Virginia Beach, VA (US)

( * ) Notice: Subject to any disclaimer, the term of this patent is extended or adjusted under 35 U.S.C. 154(b) by 0 days.

(21) Appl. No.: 18/821,505

(22) Filed: Aug. 30, 2024

Related U.S. Application Data

(60) Provisional application No. 63/536,204, filed on Sep. 1, 2023.

(51) Int. Cl.
*B42D 15/04* (2006.01)

(52) U.S. Cl.
CPC .................................. *B42D 15/042* (2013.01)

(58) Field of Classification Search
CPC .................................................... B42D 15/042
See application file for complete search history.

(56) References Cited

U.S. PATENT DOCUMENTS

| | | | | | |
|---|---|---|---|---|---|
| 5,838,466 | A * | 11/1998 | Mallik | B32B 7/12 283/901 |
| 9,308,767 | B1 * | 4/2016 | Waldron | B42D 15/042 |
| 9,836,997 | B1 * | 12/2017 | Brandrup | G09F 1/06 |
| 2011/0247247 | A1 * | 10/2011 | Mayer | B42D 15/022 40/124.03 |
| 2012/0131825 | A1 * | 5/2012 | Hoy | G09F 1/06 40/124.14 |
| 2015/0262513 | A1 * | 9/2015 | DeSanto | G09F 1/06 493/356 |

* cited by examiner

*Primary Examiner* — Gary C Hoge
(74) *Attorney, Agent, or Firm* — ALLEN, DYER ET AL.

(57) ABSTRACT

A hologram greeting card includes a first panel and a second panel joined together along an adjacent longitudinal edge. The card also includes a pop-up base having a front wall and a rear wall supporting a top frame therebetween. In addition, the card includes a pop-up platform positioned within the pop-up base on the first panel and the pop-up platform having a top surface elevated from the first panel and configured to support an electronic device thereon when the pop-up base is deployed. The card includes an expandable backdrop having a bottom edge secured proximate a rear edge of the top frame, a screen frame secured to a front of the expandable backdrop, and a pop-up screen secured within the screen frame. A pair of support struts are secured proximate a front edge of the top frame and extend to the screen frame to support the pop-up screen.

20 Claims, 5 Drawing Sheets

HOLOGRAM GREETING CARD

CROSS-REFERENCE TO RELATED APPLICATIONS

This application claims the benefit of U.S. provisional app. No. 63/536,204 filed Sep. 1, 2023, which is hereby incorporated herein in its entirety by reference.

FIELD

The present invention relates to the field of greeting cards, and, more particularly, to a hologram greeting card.

BACKGROUND

Some existing greeting cards include LCD screens that allow a user to view a short video stored in memory. These types of video greeting cards are expensive to manufacture relative to existing greeting cards. In addition, the LCD screens require batteries to operate, which further increases the cost. While these types of electronic greeting cards are desirable, the complexity of manufacturing them with the LCD screens and associated electronic components is a significant drawback.

Accordingly, what is needed in the art is a new electronic greeting card that is cost effective to manufacture and is more entertaining than a typical video greeting card.

SUMMARY

A hologram greeting card is disclosed. The hologram greeting card includes a first panel and a second panel joined together along an adjacent longitudinal edge, where the first panel has a pocket with an opening along a front edge of the first panel. The hologram greeting card also includes a pop-up base having a front wall and a rear wall supporting a top frame therebetween. The front wall is slidingly positioned within the pocket of the first panel when in a retracted position, and the rear wall is secured proximate to a rear edge of the first panel. In addition, the hologram greeting card includes a pop-up platform positioned within the pop-up base on the first panel and the pop-up platform having a top surface elevated from the first panel and configured to support an electronic device thereon when the pop-up base is deployed. The hologram greeting card also includes an expandable backdrop having a bottom edge secured proximate a rear edge of the top frame, a screen frame secured to a front of the expandable backdrop, and a pop-up screen secured within the screen frame. A pair of support struts are secured proximate a front edge of the top frame and extend to the screen frame to support the pop-up screen at an acute angle relative to the top surface of the pop-up platform when the expandable backdrop is deployed. A rear edge of the top surface of the pop-up platform is coupled to the rear wall of the pop-up base.

The hologram greeting card may also have a pull tab coupled to the front wall and configured to slide the front wall out from the pocket when pulled. The pop-up platform may include a platform front wall and a platform rear wall that support the top surface of the pop-up platform therebetween. The pop-up platform may have a front collapsible angle support between the front wall of the pop-up platform and the first panel, and a second collapsible angle support between the rear wall of the pop-up platform and the first panel. The pop-up platform may also have a vertical support coupled to the first panel between the platform front and rear walls. The top frame of the hologram greeting card may have an opening aligned between the top surface of the pop-up platform and the pop-up screen.

The hologram greeting card may include a quick response (QR) code printed on the pull tab, where the QR code is configured to be scanned by a QR reader to retrieve a corresponding hologram video to display on the electronic device. The pop-up screen is orientated relative to the top surface of the pop-up platform when deployed to generate a hologram from the hologram video. The second panel of the hologram greeting card may be configured to fold over the adjacent longitudinal edge to cover an entirety of the first panel, and the expandable backdrop may be fan folded and configured to expand when the pop-up base is deployed.

In another aspect, a hologram greeting card is disclosed that includes at least one panel, and a pop-up screen secured to the at least one panel and configured to move between a collapsed position and a deployed position. The hologram greeting card also includes a platform on the inside of the at least one panel and positioned in front of the pop-up screen when the pop-up screen is in the deployed position. The platform is configured for an electronic device to be positioned thereon, where the pop-up screen is orientated relative to electronic device to generate a hologram when in the deployed position.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
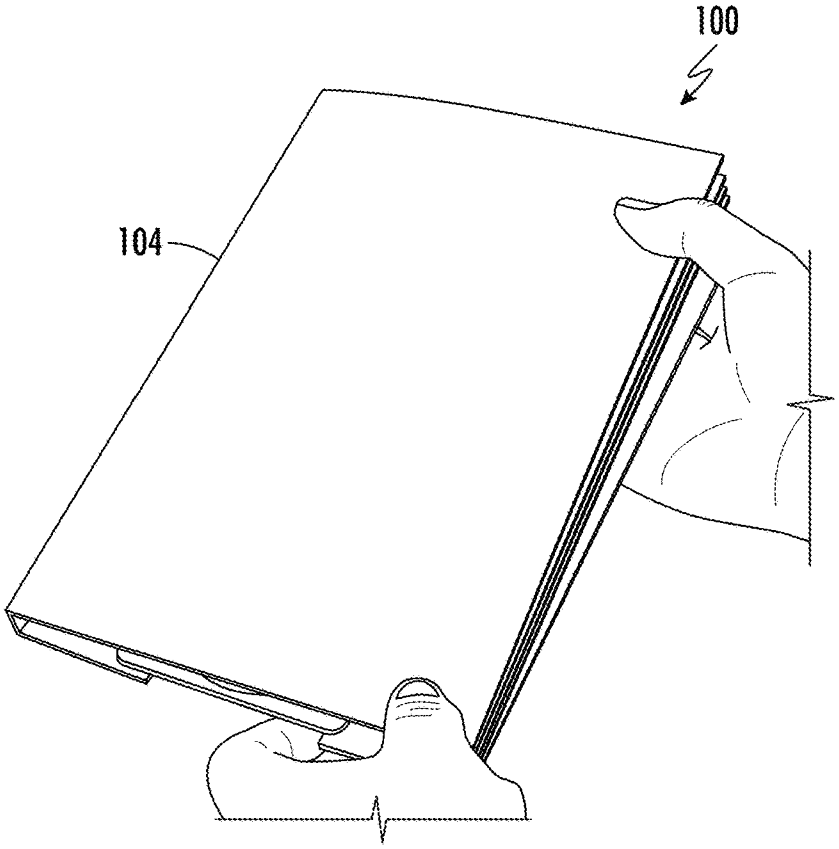
FIG. 1 is a perspective view of hologram greeting card in accordance with particular aspects of the invention disclosed herein.
Figure 2:
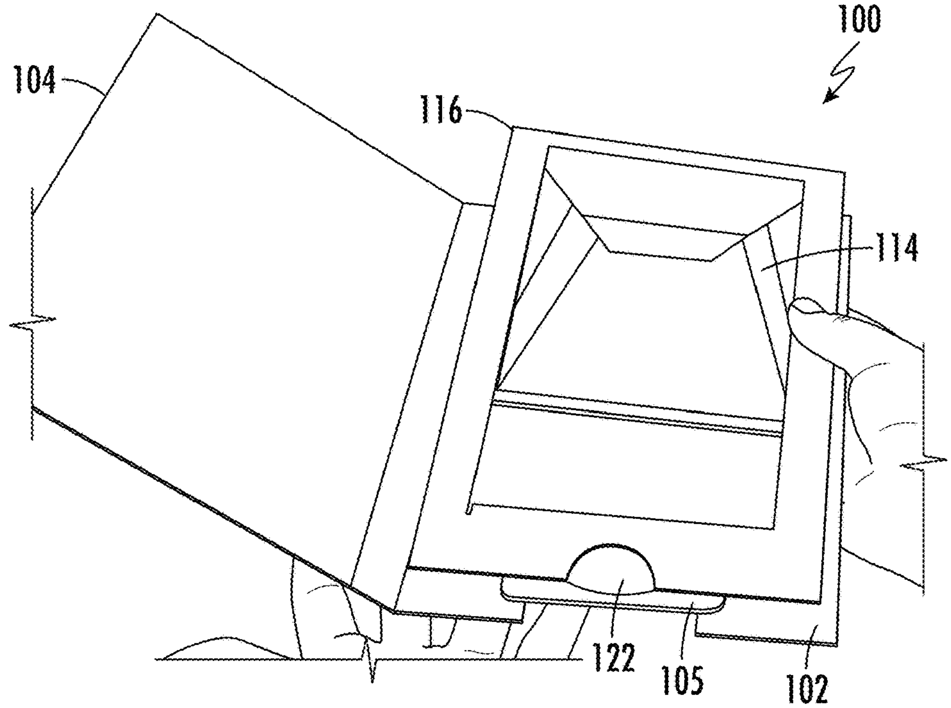
FIG. 2 is a perspective view of the hologram greeting card of FIG. 1 in an open position.

Referring now to FIGS. 1 and 2, a hologram greeting card (referred to hereinafter, as "card"), generally designated 100, includes a first panel 102, and a second panel 104 joined along an adjacent longitudinal edge. The second panel 104 is configured to open and close over an entirety of the first panel 102. The card 100 includes a similar appearance to an ordinary greeting card. As those of ordinary skill in the art can appreciate, the hologram greeting card 100 may be any shape, such as oval or diamond shaped, and is not limited to being rectangular.

When the second panel 102 is opened as shown in FIG. 2, the pop-up screen 114 can be seen in a collapsed position. The first panel 102 also includes a pocket 105 with an opening along a front edge of the first panel 102, which will be explained in more detail below. The pop-up screen 114 is secured within a screen frame 116. The pop-up screen may be transparent or have other optical qualities suitable in the process for generating a hologram and three dimensional images. The pop-up screen 114 is configured to fold relatively flat when the second panel 104 is closed over the first panel 102 and to unfold and pop-up when the second panel 104 is opened. The pop-up screen 114 may pop open automatically or may be activated manually.

Figure 3:
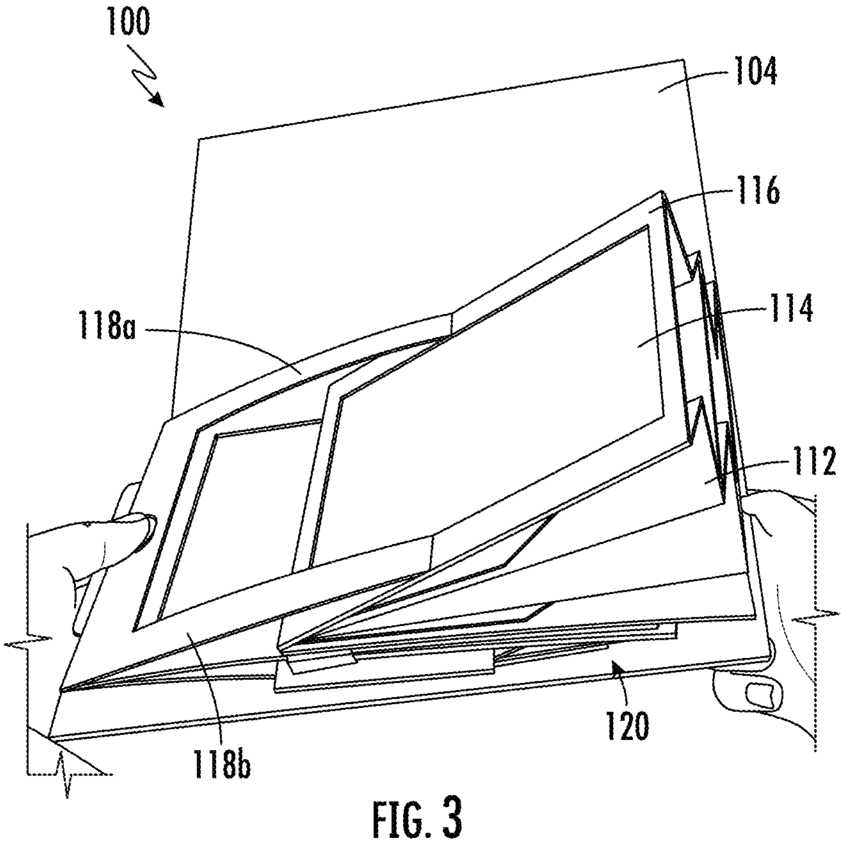
FIG. 3 is a perspective view of a pop-up screen inside the hologram greeting card in a collapsed position.
Figure 4:
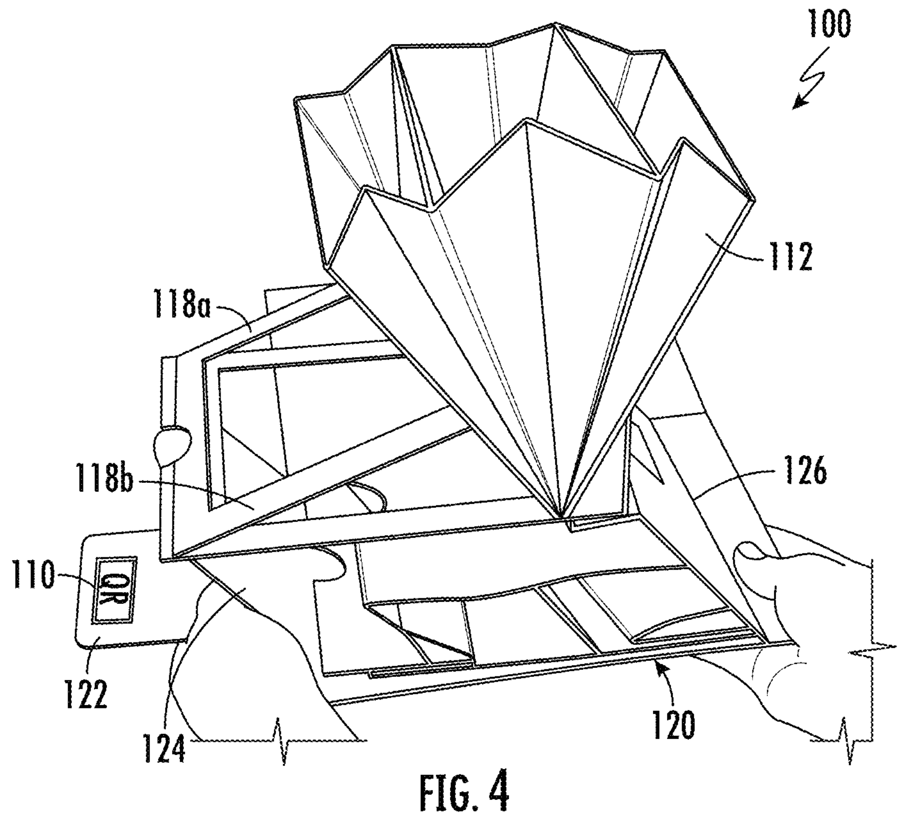
FIG. 4 is a perspective view of a pull tab of the hologram greeting card being pulled to deploy the pop-up screen.

In a particular aspect to deploy the pop-up screen manually, a pull tab 122 is pulled to begin the process to deploy a pop-up base 120, as shown in FIGS. 3 and 4. The pull tab 122 may have a quick response (QR) code 110 printed on it, wherein the QR code 110 is configured to be scanned by a QR reader to retrieve a corresponding hologram video to play on an electronic device. As those of ordinary skill in the art can appreciate, the QR code 110 may be placed anywhere on the card 100, and is not limited to placement on the pull tab 122.

The pop-up base 120 includes a front wall 124 and a rear wall 126, which support a top frame 106 therebetween. The front wall 124 is coupled to the pull tab 122. The front wall 124 is slidingly positioned within the pocket 105 of the first panel 102 when in a retracted position, and the rear wall 126 is secured proximate to a rear edge of the first panel 102.

Accordingly, as the pull tab 122 is pulled away from the first panel 102, the front wall 124 begins to slide out from the pocket 105. Once the front wall 124 is pulled out from the pocket 105, the front wall 124 is positioned vertically relative to the first panel 102. As the front wall 124 is being pulled from the pocket 105, this in turn causes the rear wall 126 to unfold and begin its pop-up movement from a collapsed position to vertical relative to the first panel 102. This pop-up movement is because the rear panel 126 is connected to the front wall 124 by the top frame 106.

Figure 5:
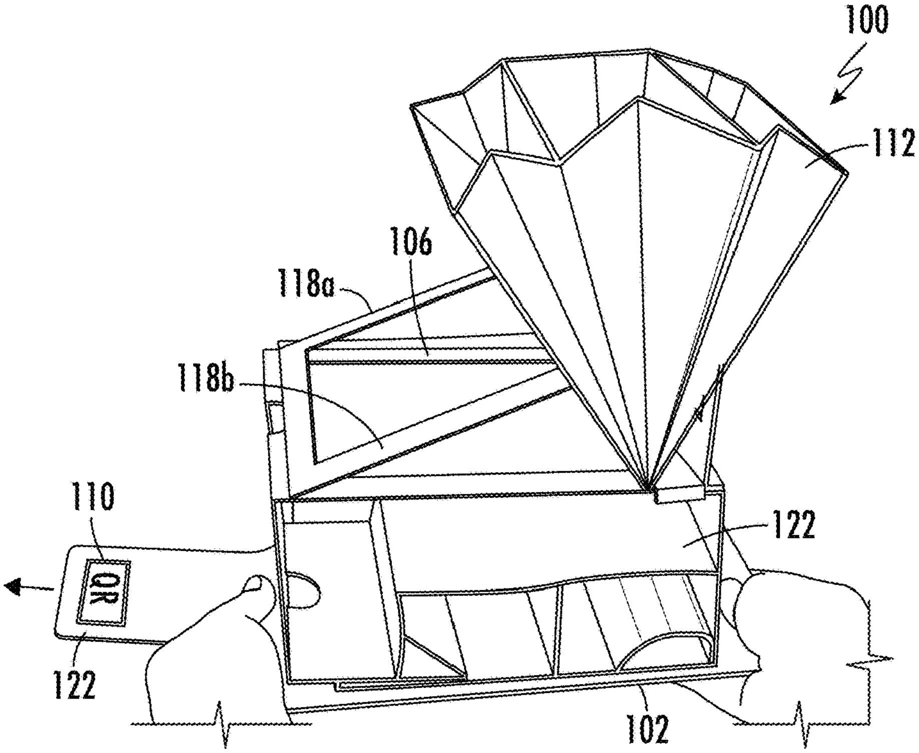
FIG. 5 is a perspective view of the pop-up screen and expandable backdrop of the hologram greeting card.
Figure 6:
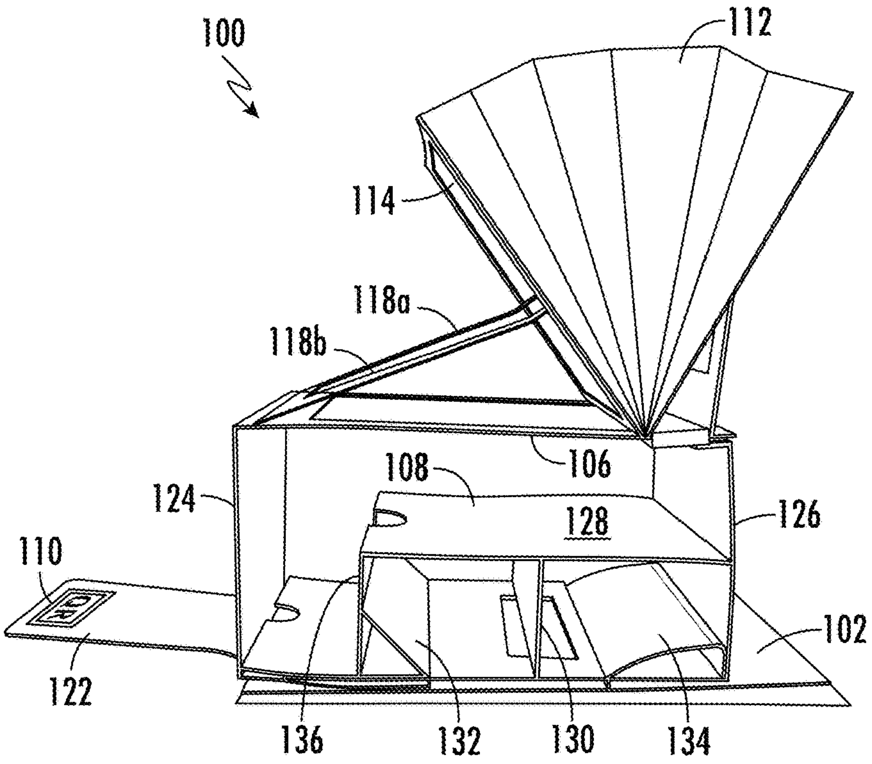
FIG. 6 is an elevational view of the hologram greeting card with the pop-up base and pop-up platform deployed.

As the pop-up base 120 is being deployed by the movement of the pull tab 122, a pop-up platform 108 and expandable backdrop 112 are also being deployed in the same movement, as shown in FIGS. 5 and 6. The pop-up platform 108 is positioned within the pop-up base 120 on the first panel 102. The pop-up platform 108 has a top surface 128 that is elevated from the first panel 102 and configured to support the electronic device 200 thereon when the pop-up base 120 is deployed.

The pop-up platform 108 includes a platform front wall 136 and a platform rear wall that is shared with the rear wall 126 of the pop-up base 120. For additional support, the pop-up platform 108 may have a front collapsible angle support 132 between the front wall 136 of the pop-up platform 108 and the first panel 102, and a second collapsible angle support 134 between the shared rear wall 126 of the pop-up platform 108 and the first panel 102. The pop-up platform 108 may also have a vertical support 130 coupled to the first panel 102 to support the top surface 128 of the pop-up platform 108.

In addition, a pair of support struts 118*a*, 118*b* are secured proximate a front edge of the top frame 106. The pair of support struts 118*a*, 118*b* extend to the screen frame 116 to support the pop-up screen 114 at an acute angle relative to the top surface 128 of the pop-up platform 108 when the expandable backdrop 112 is deployed. The expandable backdrop 122 has a bottom edge secured proximate a rear edge of the top frame 106. The expandable backdrop 122 may be fan folded and is configured to expand when the pop-up base 120 is deployed.

Figure 7:
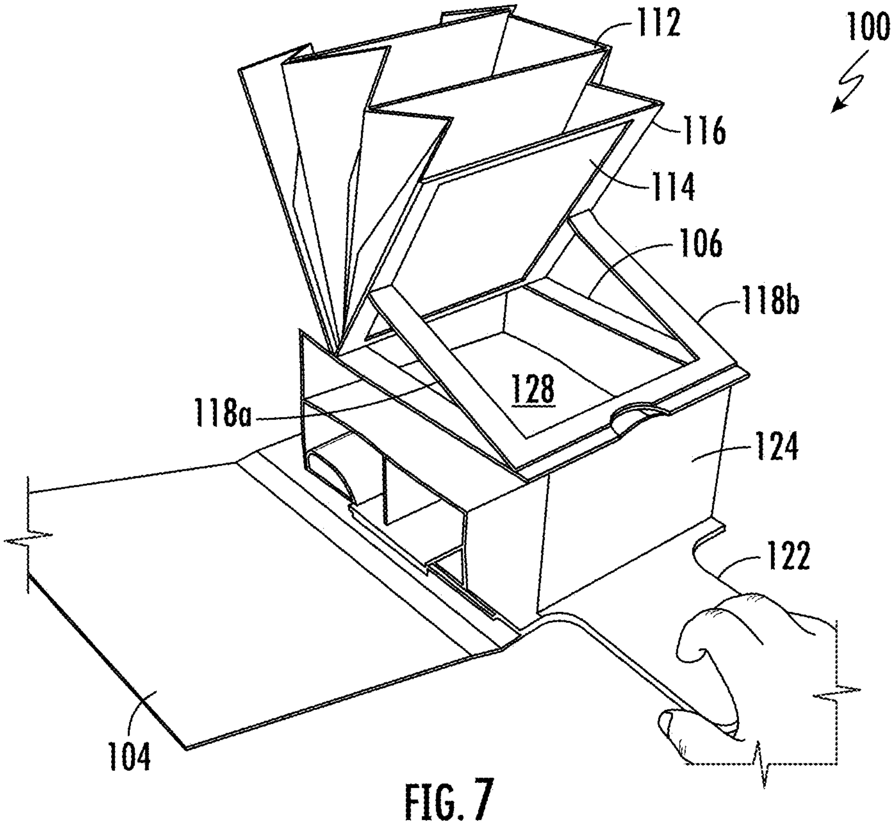
FIG. 7 is a left side perspective view of the hologram greeting card with the pop-up screen deployed.
Figure 8:
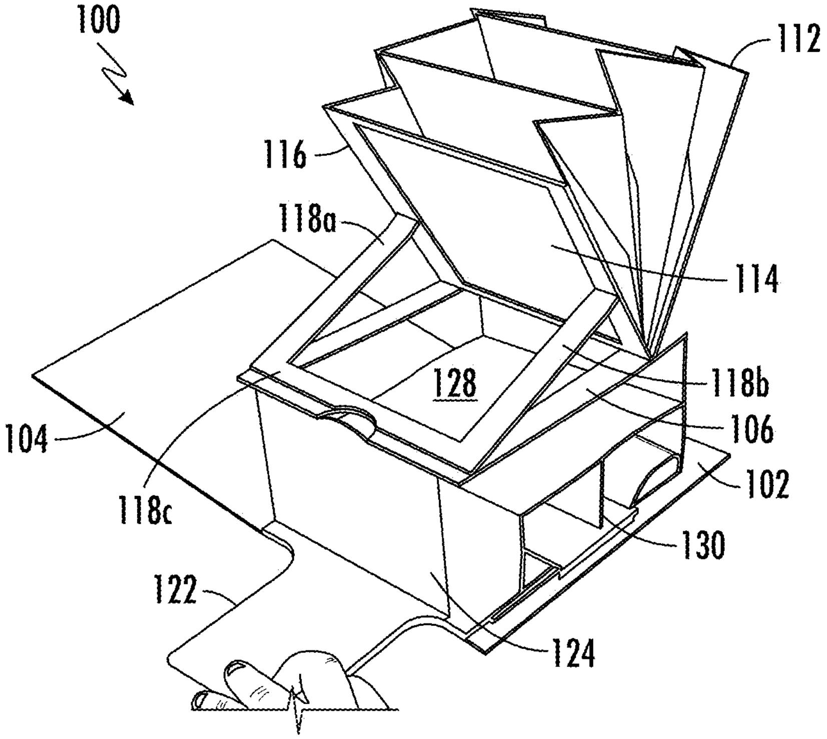
FIG. 8 is a right side perspective view of the hologram greeting card with the pop-up screen deployed.

Referring now to FIGS. 7 and 8, the pop-up screen 114 is orientated relative to the top surface 128 of the pop-up platform 108 when deployed to generate a hologram. As explained above, the card 100 may include a QR code 110 that can be scanned by a QR reader on an electronic device such as a smartphone of the user to retrieve a corresponding hologram video. The hologram video can be a personalized video to include a name of the recipient where the video wishes the recipient a happy birthday, for example. In addition, the pop-up screen 114 is not limited for use with a greeting card, as those of ordinary skill in the art can appreciate, the pop-up screen 114 can used with a book, folder, or other item.

Figure 9:
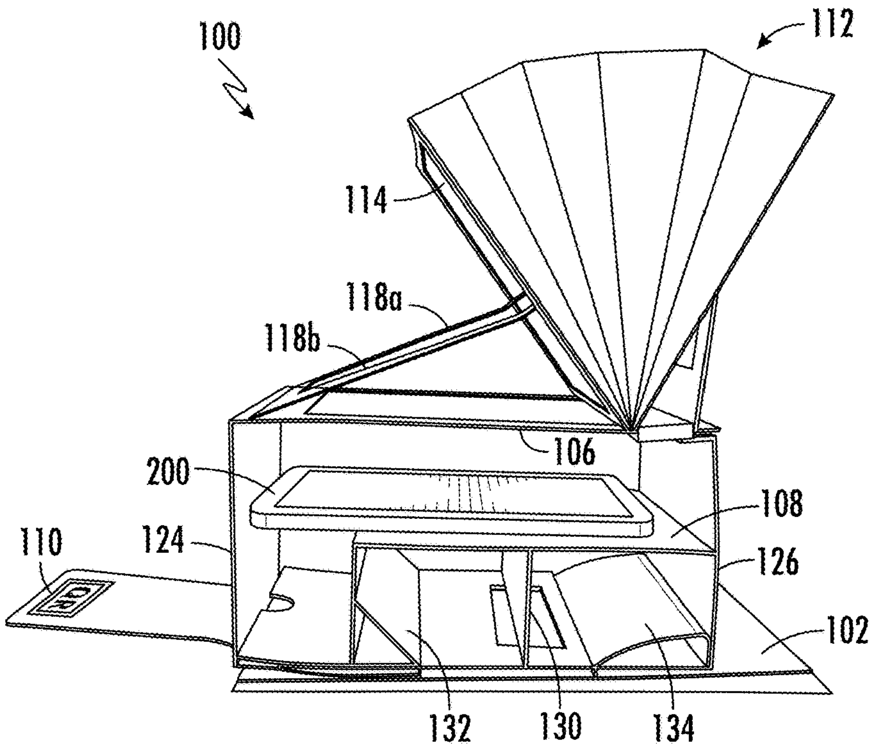
FIG. 9 is an elevational view of the hologram greeting card with an electronic device positioned on the pop-up platform.
Figure 10:
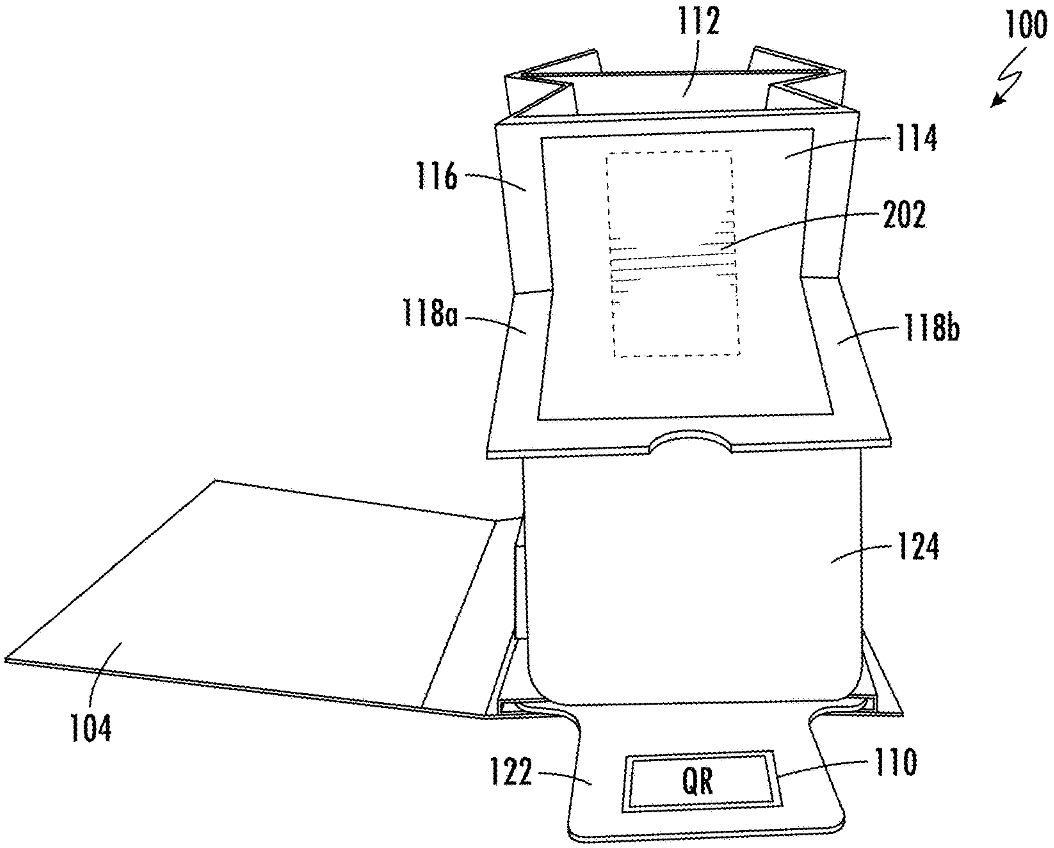
FIG. 10 is a front view of the hologram greeting card displaying a hologram.

Referring now to FIGS. 9 and 10, the pop-up platform 108 is configured to hold the electronic device 200 when projecting the hologram video to the pop-up screen 114. The top frame 106 has an opening aligned between the top surface 128 of the pop-up platform 108 and the pop-up screen 114 that allows the electronic device 200 playing the hologram video to project the hologram video to the pop-up screen 114.

The combination of the hologram video and the pop-up screen 114 generate and display a hologram 202 that is visible, as shown in FIG. 10. The user 204 can view the hologram 202 being displayed on the pop-up screen 114 due to coating optics that creates an illusion of being three-dimensional. The pop-up screen 114 may comprise other shapes and have one or more sides.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

The invention claimed is:

1. A hologram greeting card comprising:

a first panel and a second panel joined together along an adjacent longitudinal edge, wherein the first panel having a pocket with an opening along a front edge of the first panel;

a pop-up base having a front wall and a rear wall supporting a top frame therebetween, the front wall slidingly positioned within the pocket of the first panel when in a retracted position, and the rear wall secured proximate to a rear edge of the first panel;

a pop-up platform positioned within the pop-up base on the first panel and the pop-up platform having a top surface elevated from the first panel and configured to support an electronic device thereon when the pop-up base is deployed;

an expandable backdrop having a bottom edge secured proximate a rear edge of the top frame;

a screen frame secured to a front of the expandable backdrop;

a pop-up screen secured within the screen frame; and a pair of support struts secured proximate a front edge of the top frame and extending to the screen frame to support the pop-up screen at an acute angle relative to the top surface of the pop-up platform when the expandable backdrop is deployed.

2. The hologram greeting card of claim 1, wherein a rear edge of top surface of the pop-up platform coupled to the rear wall of the pop-up base.

3. The hologram greeting card of claim 1, further comprising a pull tab coupled to the front wall and configured to slide the front wall out from the pocket when pulled.

4. The hologram greeting card of claim 1, wherein the pop-up platform comprises a platform front wall and a platform rear wall that support the top surface of the pop-up platform therebetween.

5. The hologram greeting card of claim 4, wherein the pop-up platform comprises a front collapsible angle support between the front wall of the pop-up platform and the first panel, and a second collapsible angle support between the rear wall of the pop-up platform and the first panel.

6. The hologram greeting card of claim 5, wherein the pop-up platform comprises a vertical support coupled to the first panel between the platform front and rear walls.

7. The hologram greeting card of claim 1, wherein the top frame comprises an opening aligned between the top surface of the pop-up platform and the pop-up screen.

8. The hologram greeting card of claim 3, further comprising a quick response (QR) code printed on the pull tab, wherein the QR code is configured to be scanned by a QR reader to retrieve a corresponding hologram video to display on the electronic device.

9. The hologram greeting card of claim 1, wherein the pop-up screen is orientated relative to the top surface of the pop-up platform when deployed to generate a hologram.

10. The hologram greeting card of claim 1, wherein the second panel is configured to fold over the adjacent longitudinal edge to cover an entirety of the first panel.

11. The hologram greeting card of claim 1, wherein the expandable backdrop is fan folded and configured to expand when the pop-up base is deployed.

12. A hologram greeting card comprising:

a first panel and a second panel joined together along an adjacent longitudinal edge;

a pop-up base having a front wall and a rear wall supporting a top frame therebetween, the rear wall secured proximate to a rear edge of the first panel;

a pop-up platform positioned within the pop-up base on the first panel and the pop-up platform having a top surface elevated from the first panel and configured to support an electronic device thereon when the pop-up base is deployed; and a pop-up screen secured to the top frame.

13. The hologram greeting card of claim 12, further comprising a pair of support struts secured proximate a front edge of the top frame and extending to the pop-up screen to support the pop-up screen at an acute angle relative to the top surface of the pop-up platform.

14. The hologram greeting card of claim 12, further comprising a pull tab coupled to the front wall and configured to deploy the pop-up base when pulled.

15. The hologram greeting card of claim 12, wherein the pop-up platform comprises a platform front wall and a platform rear wall that support the top surface of the pop-up platform therebetween.

16. The hologram greeting card of claim 12, wherein the top frame comprises an opening aligned between the top surface of the pop-up platform and the pop-up screen.

17. The hologram greeting card of claim 12, further comprising a quick response (QR) code, wherein the QR code is configured to be scanned by a QR reader to retrieve a corresponding hologram video to display on the electronic device.

18. The hologram greeting card of claim 12, wherein the pop-up screen is orientated relative to the top surface of the pop-up platform when deployed to generate a hologram.

19. The hologram greeting card of claim 12, wherein the second panel is configured to fold over the adjacent longitudinal edge to cover an entirety of the first panel.

20. A hologram greeting card comprising:

at least one panel;

a pop-up screen secured to the at least one panel and configured to move between a collapsed position and a deployed position; and a platform on the inside of the at least one panel and positioned in front of the pop-up screen when the pop-up screen is in the deployed position and configured for an electronic device to be positioned thereon, wherein the pop-up screen is orientated relative to electronic device to generate a hologram when in the deployed position.

* * * * *